(12) United States Patent
Lawal et al.

(10) Patent No.: US 7,670,567 B2
(45) Date of Patent: Mar. 2, 2010

(54) SCALABLE MICROREACTORS AND METHODS FOR USING SAME

(75) Inventors: Adeniyi Lawal, Livingston, NJ (US); Dongying Qian, Millburn, NJ (US)

(73) Assignee: Stevens Institute of Technology, Hoboken, NJ (US)

( * ) Notice: Subject to any disclaimer, the term of this patent is extended or adjusted under 35 U.S.C. 154(b) by 569 days.

(21) Appl. No.: 11/669,386

(22) Filed: Jan. 31, 2007

(65) Prior Publication Data

US 2008/0181833 A1    Jul. 31, 2008

(51) Int. Cl.
*B01J 10/00* (2006.01)
*B01L 3/00* (2006.01)

(52) U.S. Cl. .................. 422/129; 422/188; 422/198; 422/99; 422/100

(58) Field of Classification Search ................ 422/198, 422/129, 99, 100
See application file for complete search history.

(56) References Cited

U.S. PATENT DOCUMENTS

2005/0245628 A1* 11/2005 Hubel et al. ............... 521/137
2006/0184055 A1    8/2006 Lawal et al.

FOREIGN PATENT DOCUMENTS

WO    WO 2006/105665 A2    11/2005

OTHER PUBLICATIONS

Commenge JM et al. 2002. "Optimal design for flow uniformity in microchannel reactors." Journal of American Institute of Chemical Engineers. 48(2): 345-358.
Ehrfeld W et al. Microreactors: New Technology for Modern Chemistry, 1st ed. New York,Wiley-VCH (2000), pp. 9, 239-243.
Heiszwolf JJ et al. 2001. "Hydrodynamic aspects of the monolith loop reactor." Chemical Engineering Science. 56(3): 805-812.
Jensen KF, 1999. "Microchemical systems: status, challenges, and opportunities." Journal of American Institute of Chemical Engineers. 45(10), 2051-2054.
Jensen KF. 2001. "Microreaction engineering—is small better?" Chemical Engineering Science. 56:293-303.
Kreutzer MT et al. 2005. "The pressure drop experiment to determine slug lengths in multiphase monoliths." Catalysis Today. 105(3-4): 667-672.
Qian D et al. 2006. "Numerical study on gas and liquid slugs for Taylor flow in a T-junction microchannel." Chemical Engineering Science. 61(23): 7609-7625.
Schenk R et al. 2004. "Numbering-up of micro devices: a first liquid-flow splitting unit," Chemical Engineering Journal. 101(1-3): 421-429.

* cited by examiner

*Primary Examiner*—Walter D Griffin
*Assistant Examiner*—Natasha Young
(74) *Attorney, Agent, or Firm*—Greenberg Traurig, LLP

(57) ABSTRACT

The present invention provides a scalable microreactor comprising a multilayered reaction block having alternating reaction plates and heat exchanger plates that have a plurality of microchannels; a multilaminated reactor input manifold, a collecting reactor output manifold, a heat exchange input manifold and a heat exchange output manifold. The present invention also provides methods of using the microreactor for multiphase chemical reactions.

38 Claims, 15 Drawing Sheets

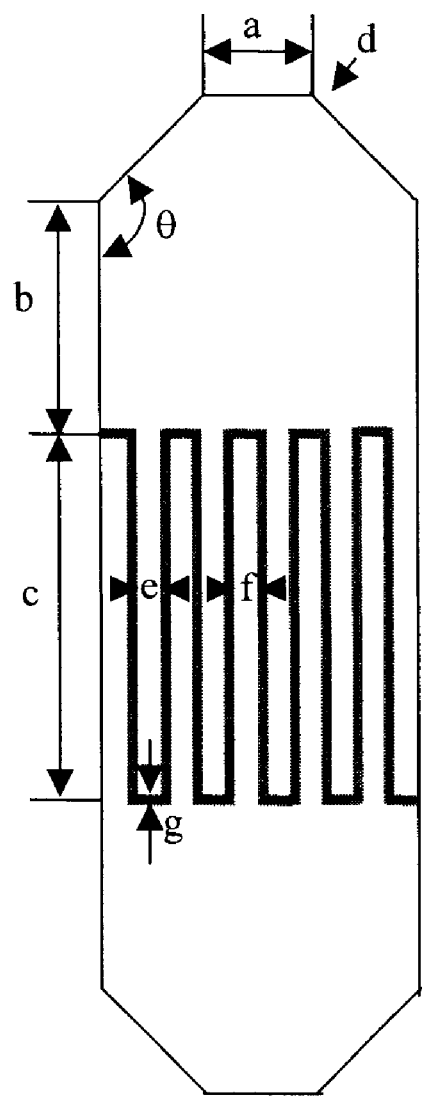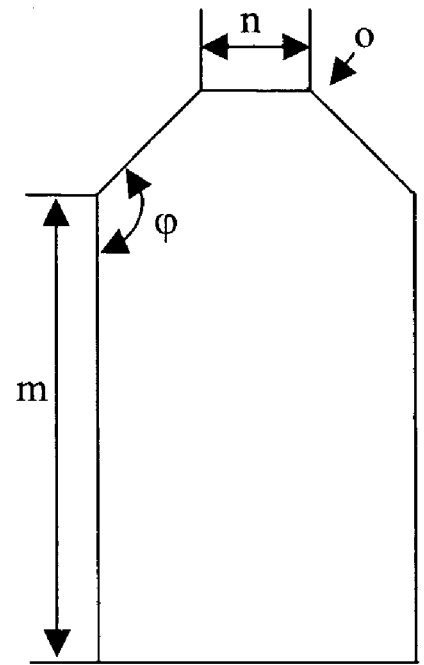
(6a)   (6b)
Fig. 6

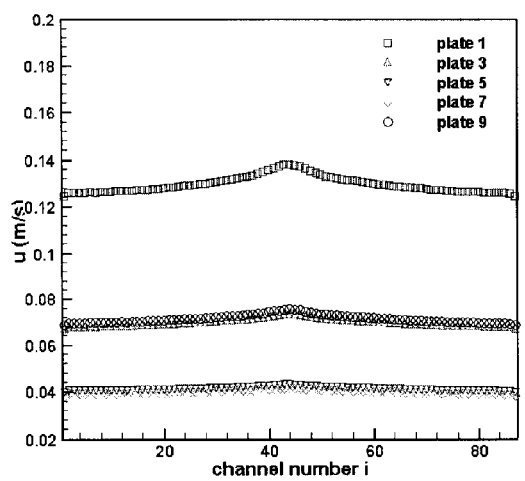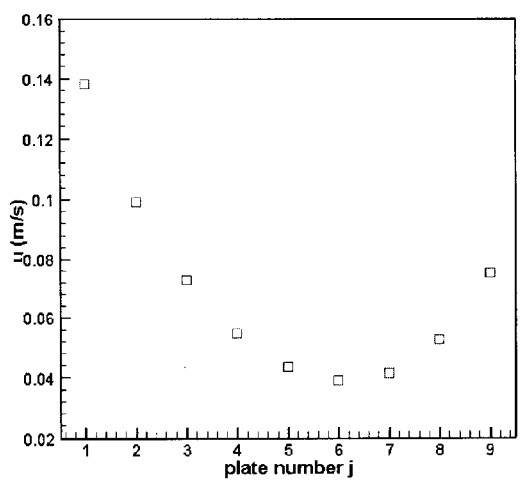
(9a) Fig. 9 (9b)

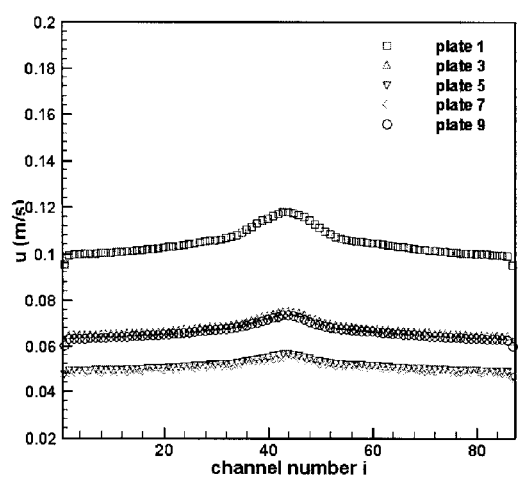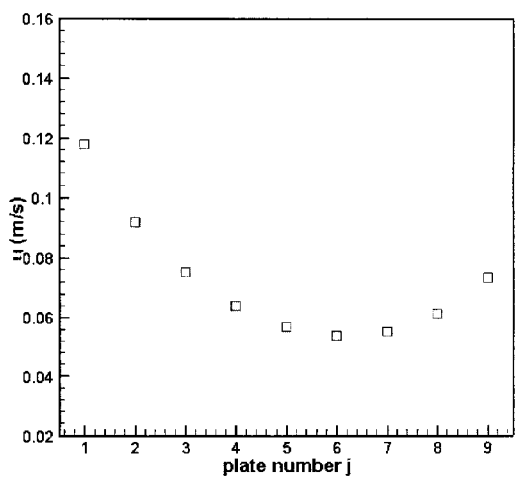
(13a)            (13b)
Fig. 13

SCALABLE MICROREACTORS AND METHODS FOR USING SAME

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. DE-FC36-02ID14427 and DE-FC36-03G013156 awarded by the U.S. Department of Energy-Industrial Technologies Program (DOE-ITP).

FIELD OF THE INVENTION

The present invention relates to an improved device that is a scalable microreactor comprising a reaction block, a pair of reactor manifolds and a pair of heat exchange manifolds, and methods of using the scalable microreactor for multiphase reactions.

BACKGROUND OF THE INVENTION

The emerging microreactor technology has attracted the attention of chemical engineers because a microchannel reactor (i.e., microreactor) has many advantages over conventional macroreactors. With its small submillimeter transverse dimensions, the microreactor possesses extremely high surface to volume ratios (e.g., $>4\times10^4$ $m^2/m^3$), and consequently, exhibits enhanced heat and mass transfer rates. The reduction in the heat and mass transfer resistances enables reactions to be carried out in extremely short residence time (e.g., millisecond) in the microreactor, thus leading to good reaction control and consequently, improved yield and selectivity of the desired products. The high heat and mass transfer rates, as well as the small reaction volume, of a microreactor also make possible reactions that up to now have been difficult to handle in macroreactors, such as highly exothermic reactions, explosive reactions, and reactions involving toxic intermediates or products. Furthermore, the small dimension of a microreactor enables system integration for optimization of material and energy management.

Microreactor technology opens up many opportunities in the development of new chemical processes or products. Various types of chemical reactors, such as membrane, packed bed and thin-film wall reactors, readily lend themselves for adaptation to microreactor technology. Diverse chemical and biological processes with single- or multi-phase flows also are appropriate for microchannel technology. Chemical analysis, chemical synthesis, and biological applications in single phase flows have been demonstrated in a number of microfluidic devices. See e.g., K. F. Jensen "Microchemical systems: status, challenges, and opportunities" (AIChE J. 45(10):2051-2054 (1999)). Multiphase flows involving, for example, gas-liquid and immiscible liquid-liquid in microchemical systems also are receiving increasing interest. For example, multiphase unit operations, such as absorption, stripping and extraction, are greatly improved compared to their macroscopic counterparts due to the large interfacial areas for mass transfer. Many fast chemical reactions, e.g. direct combination of hydrogen and oxygen to produce hydrogen peroxide, gas-liquid hydrogenation, direct fluorination of aromatic compounds, and immiscible liquid-liquid nitration, are well suited for microreactors. Other applications of multiphase flows in microreactor systems include, for example and without limitation, food processing, drug delivery, and material synthesis. K. F. Jensen in "Microreaction engineering—is small better?" discussed the role of reaction engineering in the development of microreactor technology (*Chem. Eng. Sci.* 56: 293-303 (2001)).

One of the attractive advantages of microreactor technology is the ease of "scaling up". The scale-up for high throughput is very important for microreactors since the reaction volume is extremely small. This is generally accomplished through a so called "numbering-up" process by simply replicating the microreactor unit whereby the desired features of the microreactor unit are preserved when increasing the total size of the microreactor system. See e.g., W. Ehrfeld et al., *Microreactors: New Technology for Modern Chemistry*, 1$^{st}$ ed. Wiley-VCH: New York (2000), p. 9. Numbering-up allows greater system flexibility; for example, by numbering-up the costly reactor redesign and pilot plant experiments normally required in macroreactor design can be eliminated, thus shortening the development time from laboratory to commercial production. This approach may be advantageous particularly for the fine chemical and pharmaceutical industries where the production can often be as small as a few metric tons per year.

The numbering-up process is often an internal numbering-up process, which involves the parallel connection of the functional elements (microreactors) rather than of the complete microreactor systems (i.e., microreactor units plus balance of microreactor systems). Multiple microreactors basically are required to be grouped in such a way as to provide a compact design. Often, microchannels are arranged in parallel on a plate, and multiple plates are stacked to form a block. The block is herein referred to as "reactor block" or "reaction block."

Although the scale-up may appear simple in microreactor technology, the numbering-up process is actually at an early stage in the microreactor field. See R. Schenk et al in "Numbering-up of micro devices: a first liquid-flow splitting unit" (*Chem. Eng. J.* 101(1-3):421-429 (2004)). A challenge in numbering-up is the design of the flow distributor. Microreactor performance is dependent on flow dynamics. Equal flow distribution in each microchannel is a necessary condition to assure equal mass flow rate, heat transfer and resident time of reactants. Uneven flows can lead to varying reaction and heat transfer rates in different channels. Poor flow distribution also can lead to local "hot spots" or "quench spots", which can decrease conversion of reactants and selectivity of products, reduce catalyst lifetime, or lead to side reactions that degrade the microreactor performance.

It is a challenge to distribute the flow into hundreds or thousands of microchannels in a uniformly controlled manner. The flow distributor (or manifold) upstream from the microreactor block serves this purpose. This upstream flow distributor basically includes an inlet and a flow directing chamber zone. The design of the chamber is elemental to ensuring even flow distribution. The actual flow rate in each microchannel depends on the full flow path, which includes the reactor input manifold, the reactor block and the reactor output manifold. The reactor input manifold distributes the flow of the reactants and reaction medium, if present, while the reactor output manifold collects the flow of product or effluent. The relationship between the geometrical dimensions of the manifolds and the flow distribution can be approximately estimated by some simplified models or analogies of circuit theory. J. M. Commenge et al. in "Optimal design for flow uniformity in microchannel reactors" design a manifold for single phase flow distribution on a plate. International Patent Application No. WO 2005/105665 A2 discloses several types of manifold configurations for single phase flow distribution on multiple plates.

The design of the manifold for multiphase flow in multi-plate configurations is more challenging than that for single phase flow because, for example, this manifold serves not only as a flow distributor, but also as a multiple phase mixing device. In a wide range of processing and operating conditions, gas-liquid and liquid-liquid flows in microchannels are in the so called slug flow regime (also known as the "Taylor flow regime"), which refers to a flow pattern where gas bubbles (or liquid plugs) are separated from each other by liquid plugs (or immiscible liquid plugs) in a channel. That is to say, the slug flow regime is characterized by alternating slugs of two different fluids. See e.g., D. Qian & A. Lawal "Numerical study on gas and liquid slugs for Taylor flow in a T-junction microchannel" (*Chem. Eng Sci.* 61(23):7609-7625 (2006)). In the slug flow regime, the mass transfer is dependent on the slug length, which in turn depends on the manifold configuration. For example, the shorter the slug length, the lower the mass transfer resistance across the interface of the alternating slugs. In consequence, the manifold design influences the mass transfer and reactor performance. W. Ehrfeld et al., supra, discuss a manifold configuration for gas-liquid distribution in multichannel microreactors on a single plate (pp. 239-243). J. J. Heiszwolf et al. in "Hydrodynamic aspects of the monolith loop reactor" (*Chem. Eng. Sci.*, 56(3):805-812 (2001)) and M. T. Kreutzer et al. in "The pressure drop experiment to determine slug lengths in multiphase monoliths" (*Catalysis Today*, 105(3-4):667-672 (2005)) use nozzle-type and shower-head distributors on a monolith. A manifold design on a multichannel, multi-plate microreactor for multiphase reactions has not been disclosed.

The present invention is directed to multichannel, multi-plated (also referred to as multilayered) microreactor and to methods for using the microreactor for multiphase reactions. The present invention also is directed to such a microreactor that is scalable, i.e., has the ability to be numbered-up (scaled-up).

SUMMARY OF THE INVENTION

The present invention provides a scalable microreactor comprising:
a) a multilayered reaction block comprising:
   (i) a plurality of reactor plates, each reactor plate having a plurality of reaction channels with each reaction channel having an inlet and an outlet;
   (ii) a plurality of heat exchanger plates, each heat exchanger plate having a plurality of heat exchange channels with each heat exchange channel having an inlet and an outlet; and
   (iii) four faces,
   wherein:
      (A) the plurality of reactor plates and heat exchanger plates are arranged in an alternating sequence to form the multilayered reaction block;
      (B) the plurality of reaction channel inlets are aligned on a first face of the multilayered reaction block;
      (C) the plurality of reaction channel outlets are aligned on a second face of the multilayered reaction block;
      (D) the plurality of heat exchange channel inlets are aligned on a third face of the multilayered reaction block; and
      (E) the plurality of heat exchange channel outlets are aligned on a fourth face of the multilayered reaction block;

b) a reactor input manifold coupled to the first face of the multilayered reaction block, the reactor input manifold comprising:
   (i) at least two reactor input chambers; and
   (ii) a multilamination chamber fluidly coupled to the at least two reactor input chambers, the multilamination chamber comprising a plurality of interdigitated distribution channels for feeding independently at least a first feed stream and a second feed stream from the at least two reactor input chambers,
   wherein the reactor input manifold is configured so that each reaction channel inlet of the multilayered reaction block is aligned and in fluid communication with at least one pair of interdigitated distribution channels;
c) a reactor output manifold coupled to the second block face, the reactor output manifold comprising:
   (i) at least one reactor output chamber; and
   (ii) a collection chamber fluidly coupled to the at least one reactor output chamber, the collection chamber comprising a plurality of collection channels for directing a reaction output stream from the plurality of reaction channel outlets to the at least one reactor output chamber,
   wherein the reactor output manifold is configured so that each reaction channel outlet of the multilayered reaction block is aligned and in fluid communication with a collection channel;
d) a heat exchange input manifold coupled to the third face of the multilayered reaction block, the heat exchange input manifold comprising at least one heat exchange input chamber that is positioned to receive a heat exchange feed stream and is in fluid communication with the plurality of heat exchange channel inlets of the multilayered reaction block; and
e) a heat exchange output manifold coupled to the fourth face of the multilayered reaction block, the heat exchange output manifold comprising at least one heat exchange output chamber that is positioned to receive a heat exchange output stream and is in fluid communication with the plurality of heat exchange channel outlets of the multilayered reaction block The present invention also provides a scalable microreactor wherein:
a) the heat exchange input manifold of d) comprises:
   (i) at least two heat exchange input chambers that are positioned to receive independently a first and second heat exchange feed streams; and further comprises:
      (a) a multilamination chamber fluidly coupled to the at least two heat exchange input chambers, the multilamination chamber comprising a plurality of interdigitated distribution channels for feeding independently the first and the heat exchange feed streams from the heat exchange input chambers,
   wherein the heat exchange input manifold is configured so that each heat exchange channel inlet of the multilayered reaction block is aligned and in fluid communication with at least one pair of interdigitated distribution channels; and
b) the heat exchange output manifold of e) further comprises a collection chamber fluidly coupled to the at least one heat exchange output chamber, the collection chamber comprising a plurality of collection channels for directing a heat exchange output stream from the plurality of heat exchange channel outlets to the at least one heat exchange output chamber, wherein the heat exchange output manifold is configured so that each heat exchange channel outlet of the multilayered reaction block is aligned and in fluid communication with a collection channel.

The present invention also provides a method of performing a reaction, the method comprising:
a) providing a scalable microreactor of the present invention;
b) feeding a first feed stream and a second feed stream through the reactor input manifold to form a plurality of multiphase reaction streams;
c) feeding the plurality of multiphase reaction streams through the inlets of the plurality of reaction channels and into the reaction channels;
d) reacting the plurality of multiphase reaction streams to create a plurality of product streams;
e) feeding a heat exchange feed stream through the heat exchange input manifold to form a plurality of heat exchange streams, which are then fed through the inlets of the plurality of heat exchange channels and into the heat exchange channels;
f) collecting in the reactor output manifold the plurality of product streams from the outlets of the plurality of reaction channels; and
g) collecting in the heat exchange output manifold the plurality of heat exchange streams from the outlets of the plurality of heat exchange channels.

The present invention also provides a method of performing a reaction, the method comprising:
a) providing a scalable microreactor of the present invention;
b) feeding a first feed stream and a second feed stream through the reactor input manifold to form a first plurality of multiphase reaction streams;
c) feeding a third feed stream and a fourth feed stream through the heat exchange input manifold to form a second plurality of multiphase reaction streams;
d) feeding the first plurality of multiphase reaction streams of step b) through the inlets of the plurality of reaction channels and into the reaction channels;
e) feeding the second plurality of multiphase reaction streams of step c) through the inlets of the plurality of heat exchange channels and into the heat exchange channels;
f) reacting the first plurality of multiphase reaction streams to create a first plurality of product streams;
g) reacting the second plurality of multiphase reaction streams to create a second plurality of product streams;
h) collecting in the reactor output manifold the first plurality of product streams from the outlets of the plurality of reaction channels; and
i) collecting in the heat exchange output manifold the second plurality of product streams from the outlets of the plurality of heat exchange channels.

BRIEF DESCRIPTION OF THE DRAWING

FIG. 6: schematic illustrations of a reactor input manifold (6a) and a heat exchange input manifold (6b) of the present invention.

FIGS. 7-13: graphical representations of flow distribution among reaction channels (7-13a) and between different plates (7-13b) for Examples 1-7 of the present invention.

DETAILED DESCRIPTION OF THE INVENTION

Figure 1:
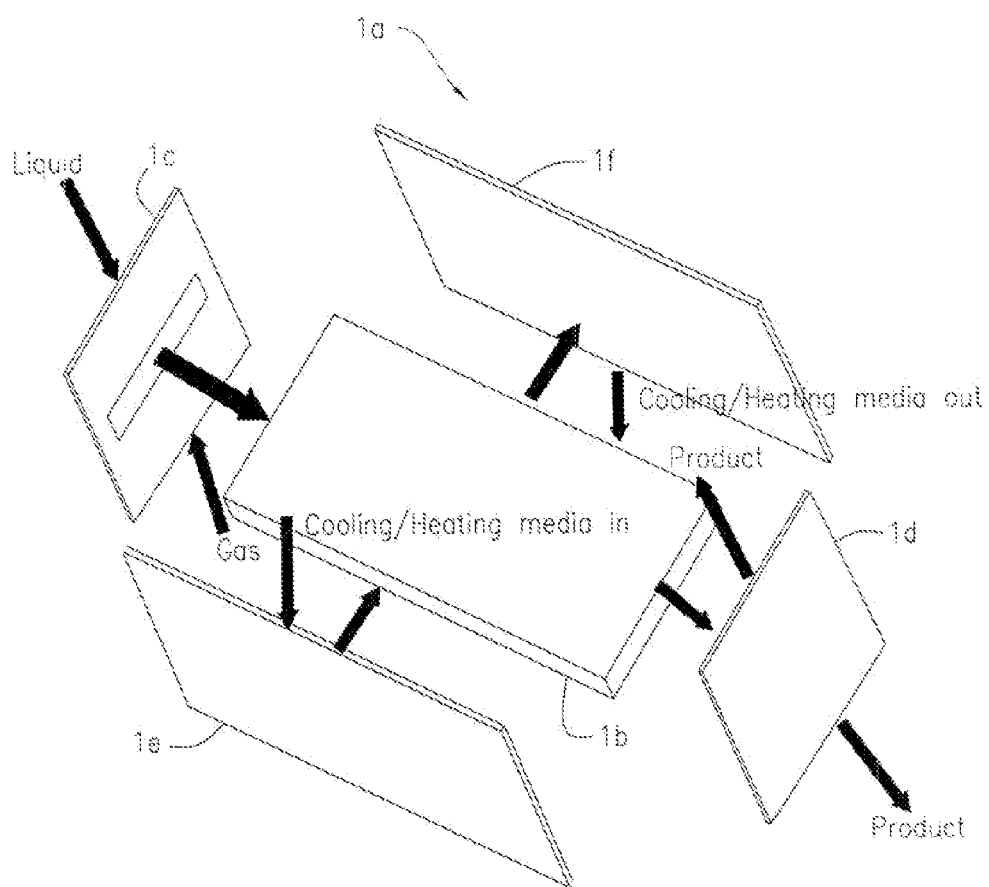
FIG. 1: an exploded schematic illustration of a scalable microreactor of the present invention (1a), including a reactor block (1b) integrated with reactor plates and heat exchanger plates, a reactor input manifold (1c), a reactor output manifold (1d), a heat exchange input manifold (1e) and a heat exchange output manifold (1f).

Definitions. In describing the present invention, the following terms and phrases will be used and are intended to be defined as indicated immediately below. Definitions for other terms and phrases can occur throughout the specification. It is intended that all terms and phrases used in the specification include the plural, active tense and past tense forms of a term or a phrase.

As used herein, the term, "feed stream" refers to the supply or introduction of a substance into a device (e.g., a microreactor unit) or system (e.g., a microreactor system).

As used herein, the term, "heat exchange feed stream" refers to the flow of a substance that is capable of effecting thermal regulation in a device (e.g., a microreactor unit) or system (e.g., a microreactor system). Examples, without limitation, include cooling water, cooling air, and steam. Synonymous phrases include heating stream and cooling stream.

As used herein, the term "mixture" refers to a sample of matter having more than one pure element or compound in association. A mixture can be homogeneous (meaning uniform or identical throughout) or heterogeneous (meaning dissimilar or non-uniform throughout).

As used herein, the term "multilamination" refers to the alternating laminations via geometric parameters that allow rapid mixing by diffusion (i.e., the principle of multilamination, which is well known in the microreactor technology art) of the laminar flows in microchannels.

As used herein, the term "phase" refers to a set of thermodynamic states of a macroscopic physical system that have relatively uniform chemical composition and thermophysical properties (i.e., density, index of refraction, temperature, and so forth).

As used herein, the term "multiphase" refers to a mixture of more than one phase, which includes any combinations of gas, liquid and solid phases.

As used herein, the phrase "multiphase reaction stream" refers to a flow of a multiphase mixture entering into the reactor.

As used herein, the terms "packed" and "packing" mean to fill with an amount of catalyst that allows for the effective production of a predetermined amount of a product and often requires taking into consideration, e.g., the size of a reaction channel, the number of reaction channels, the particular catalyst, catalyst particle size, and the predetermined amount of product, and thus, can mean 100% filled with catalyst or less than 100% filled (i.e., partially filled) with catalyst.

As used herein, the term "product" refers to a substance that is formed during a chemical reaction (see e.g., the *International Union of Pure and Applied Chemistry (IUPAC) Compendium of Chemical Terminology*, $2^{nd}$ ed. (1997)).

As used herein, the phrase "product stream" refers to a flow of product through a device (e.g., a microreactor unit) or system (e.g., a microreactor system).

As used herein, the term "reactants" refers to an original substance that enters into a reaction.

As used herein, the term "reaction" refers to a process in which one or more substances are transformed into another substance or substances, such as, a chemical reaction, which results in the interconversion of chemical species (IUPAC, supra).

As used herein, the phrase "reaction medium" refers to a substance or composition through which reactants are fed into a reactor, and which itself does not participate in the reaction.

As used herein, the term "reactor" or the phrases "reaction block", "reactor block", "reactor system" refers to a device or an assemblage of related devices for containing or controlling a reaction or reactions (e.g., chemical reaction).

As used herein, the terms "react," "reacted" and "reacting" mean undergoing a reaction, as defined herein.

As used herein, the phrase "total path length" refers to the total distance that a flow stream traverses from the point where it enters the reactor system to the point where it exits the reactor system As used herein, the phrase "wall thickness" refers to the width of the solid material between two adjacent microchannels.

One aspect of the present invention is a scalable microreactor comprising:
a) a multilayered reaction block comprising:
  (i) a plurality of reactor plates, each reactor plate having a plurality of reaction channels with each reaction channel having an inlet and an outlet;
  (ii) a plurality of heat exchanger plates, each heat exchanger plate having a plurality of heat exchange channels with each heat exchange channel having an inlet and an outlet; and
  (iii) four faces,
  where:
    (A) the plurality of reactor plates and heat exchanger plates are arranged in an alternating sequence to form the multilayered reaction block;
    (B) the plurality of reaction channel inlets are aligned on a first face of the multilayered reaction block;
    (C) the plurality of reaction channel outlets are aligned on a second face of the multilayered reaction block;
    (D) the plurality of heat exchange channel inlets are aligned on a third face of the multilayered reaction block; and
    (E) the plurality of heat exchange channel outlets are aligned on a fourth face of the multilayered reaction block;
b) a reactor input manifold coupled to the first face of the multilayered reaction block, the reactor input manifold comprising:
  (i) at least two reactor input chambers; and
  (ii) a multilamination chamber fluidly coupled to at least two reactor input chambers, the multilamination chamber comprising a plurality of interdigitated distribution channels for feeding at least a first feed stream and a second feed stream independently from at least two reactor input chambers,
  where the reactor input manifold is configured so that each reaction channel inlet of the multilayered reaction block is aligned and in fluid communication with at least one pair of interdigitated distribution channels;
c) a reactor output manifold coupled to the second face of the block, the reactor output manifold comprising:
  (i) at least one reactor output chamber; and
  (ii) a collection chamber fluidly coupled to at least one reactor output chamber, the collection chamber comprising a plurality of collection channels for directing a reaction output stream from the plurality of reaction channel outlets to at least one reactor output chamber,
  where the reactor output manifold is configured so that each reaction channel outlet of the multilayered reaction block is aligned and in fluid communication with a collection channel;
d) a heat exchange input manifold coupled to the third face of the multilayered reaction block, the heat exchange input manifold comprising at least one heat exchange input chamber that is positioned to receive a heat exchange feed stream and is in fluid communication with the plurality of heat exchange channel inlets of the multilayered reaction block; and
e) a heat exchange output manifold coupled to the fourth face of the multilayered reaction block, the heat exchange output manifold comprising at least one heat exchange output chamber that is positioned to receive a heat exchange output stream and is in fluid communication with the plurality of heat exchange channel outlets of the multilayered reaction block.

FIG. 1 illustrates an embodiment of a scalable microreactor of the present invention (1*a*), depicting associated flow paths, which includes a reactor block (1*b*), a reactor input manifold (1*c*), a reactor output manifold (1*d*), a heat exchange input manifold (1*e*) and a heat exchange output manifold (1*f*). The design of the scalable microreactor of the present invention was guided by transport phenomena theory, computational fluid dynamic (CFD) methods (such as three-dimensional (3D) simulations), and commercial software packages such as Pro/E® (3D mechanical design suite by Elite Consulting Limited, Northampton, UK) and Gambit/Fluent (geometry, mesh generation and flow simulation software by Fluent Inc., Lebanon, N.H., USA).

Figure 3:
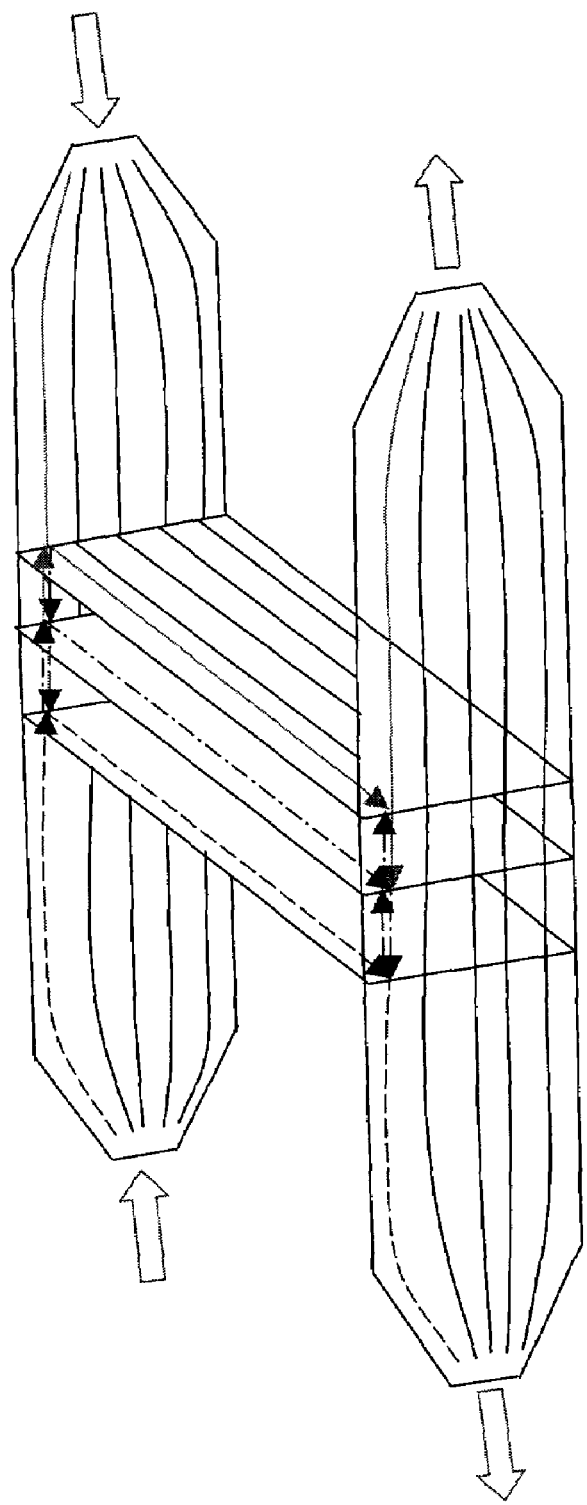
FIG. 3: a schematic illustration of flow path of a microreactor of the present invention, which includes the path of flow through a reactor input manifold, through a reaction block, and then through a reaction output manifold (i.e., total path length).

The design of the manifolds of the present invention is based on the principle that each fluid particle traverses approximately the same distance from an inlet of an input manifold through a microchannel to an outlet of an output manifold. FIG. 3 illustrates the flow paths of fluid particles that originate from the same manifold and traverse the same interdigitated channel, but subsequently travel through different reactor plates. The flow paths of such fluid particles are different, hence it is often more difficult to obtain a uniform flow distribution among the different reactor plates than among the different channels of the same plate; this can be a design constraint. The design of the microreactor of the present invention aims to minimize the difference in the traveling distance among fluid particles of different plates to negligibility.

Figure 4:
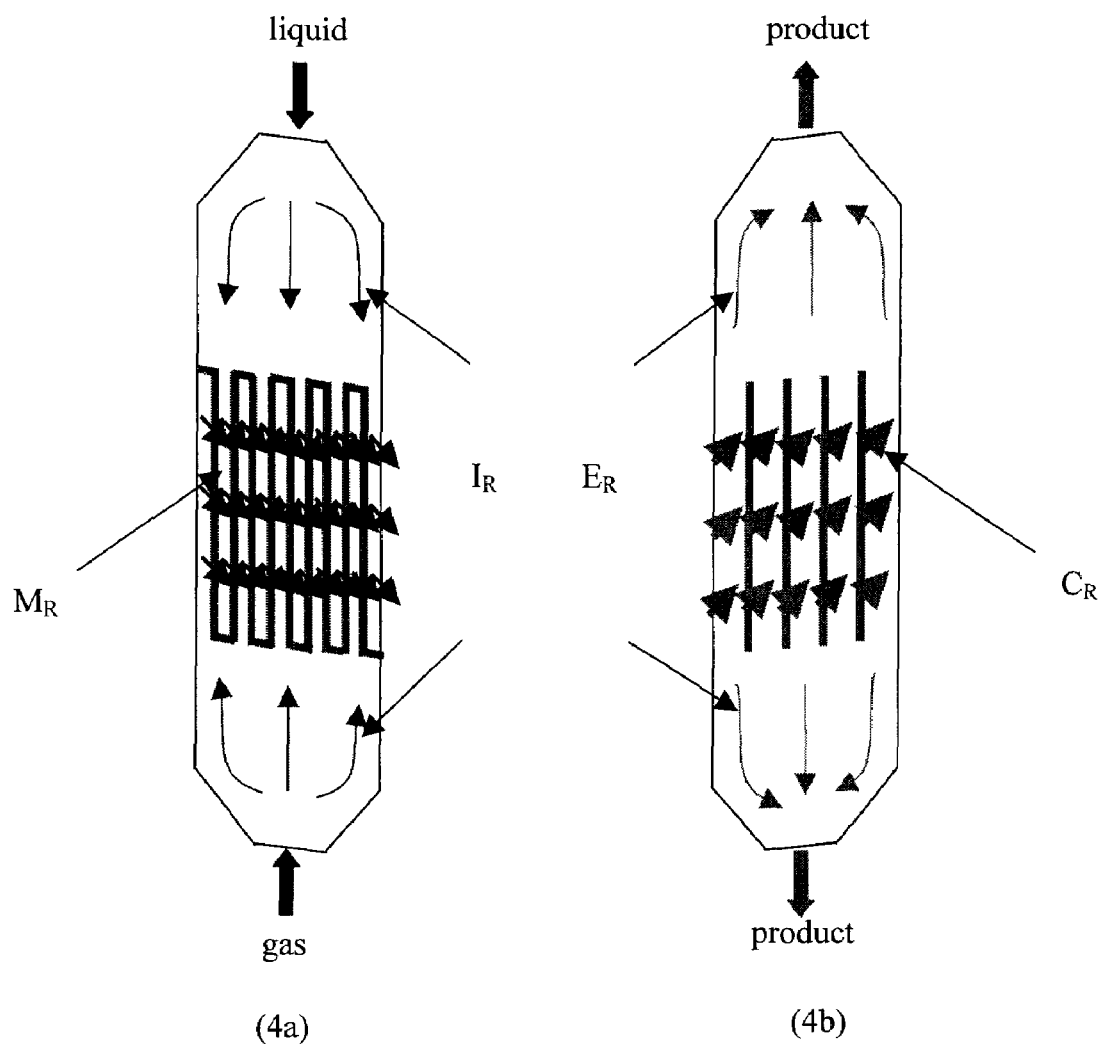
FIG. 4: schematic illustrations of a reactor input manifold (4a) and a reactor output manifold (4b) of the present invention.

FIG. 4 illustrates a reactor input manifold (4*a*) and a reactor output manifold (4*b*) of an embodiment of the present invention. The reactor input manifold distributes the flow of the reactants and reaction medium, if present, while the reactor output manifold collects the flow of product or effluent. The geometrical configurations of the input manifold and the output manifold ensure uniform flow distribution in the reaction channels of the reactor block. In this embodiment, the reactor input manifold has reactor input chambers ($I_R$) for a first feed stream and a second feed stream, respectively, while the reactor output manifold has two reactor output chambers ($E_R$) for product outlet streams. Further, the reactor input manifold comprises a multilamination chamber ($M_R$) where the interdigitated distribution channels direct the flow from the manifold into the reaction block. The multilamination chamber provides for the multilamination of two fluids. Although there is no direct fluid mixing in the multilamination chamber, and thus, the reactor input manifold, the multilamination chamber of the reactor input manifold determines the mixing degree at each reaction channel inlet. The reactor output manifold comprises a collection chamber ($C_R$), which collects the output or effluent (e.g., product) from the reaction channels of the reactor block. Often the product is still in a multiphase form, each phase being a mixture comprising the products and unreacted reactants. The interdigitated distribution channels of the multilamination chamber of the reactor input manifold and the collection channels of the collection chamber of the reactor output manifold are oriented in a direction perpendicular to the direction of the reactor plates. In some embodiments, the geometry of the reactor input chambers ($I_R$) and the geometry of the reactor output chambers ($E_R$) are the same, and the two chambers of the reactor input manifold and the two chambers of the reactor output manifold are symmetric about the central line of their respective manifold.

Figure 5:
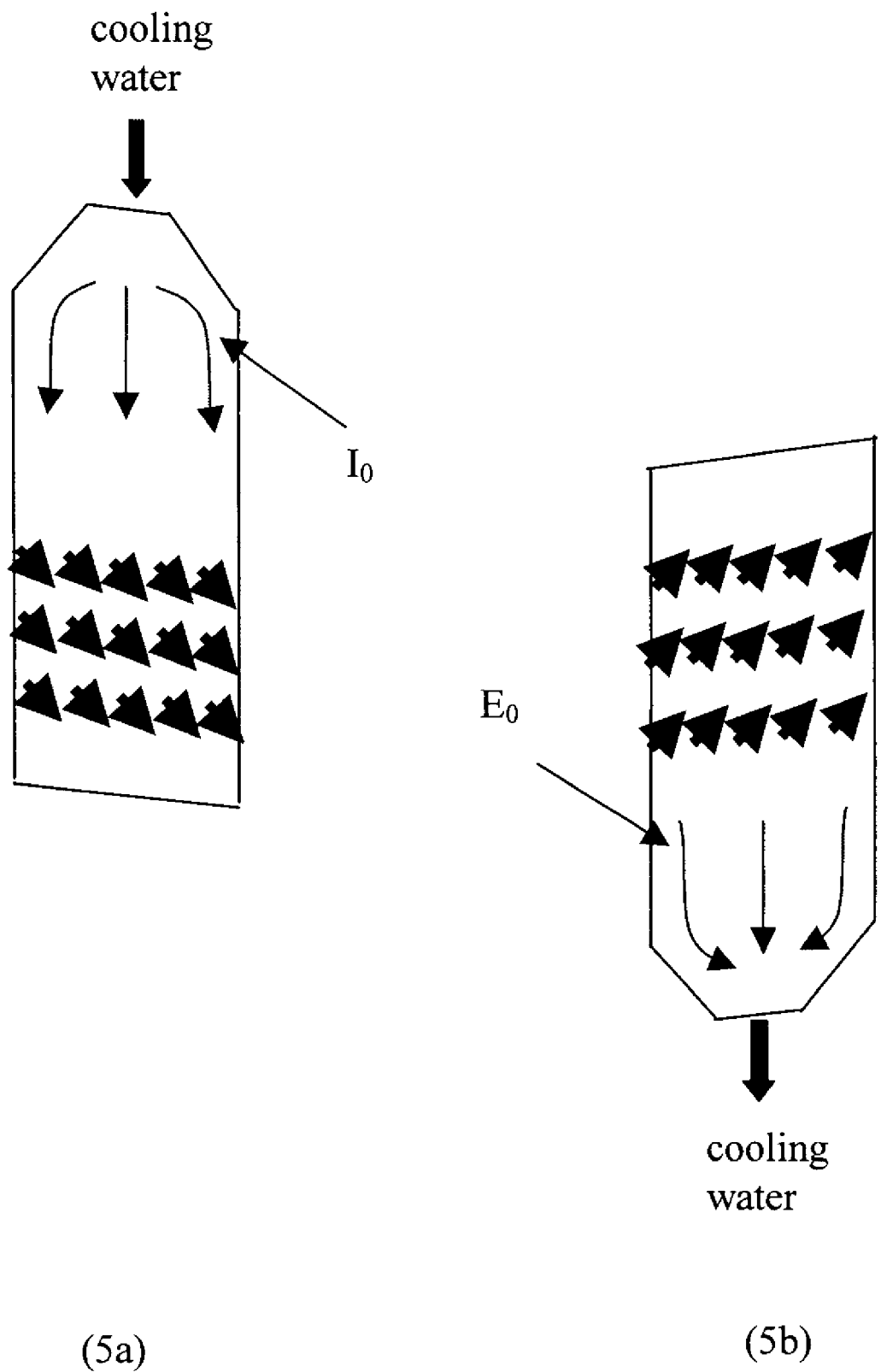
FIG. 5: schematic illustrations of a heat exchange input manifold (5a) and a heat exchange output manifold (5b) of the present invention.

FIG. 5 illustrates a heat exchange input manifold (5a) and a heat exchange output manifold (5b) of an embodiment of the present invention. The geometrical configurations of the input manifold and the output manifold ensure uniform flow distribution in the heat exchange channels of the heat exchanger plates. In this embodiment, a heat exchange input chamber ($I_O$) and a heat exchange output chamber ($E_O$) direct the flow of heat exchange feed and output streams. In some embodiments, the geometry of the heat exchange input manifold and the geometry of the output manifold are configured the same but oriented in opposite directions.

The plates of the multilayered reactor block can be made from materials suitable for conducting a reaction therein; for example, materials that are inert and thermally stable to the reactants, reaction medium and/or heat exchange medium used with a particular reaction carried out in the reactor block. Also, the materials should be capable of being fashioned into plates of submillimeter dimensions. Materials useful for fashioning the plates of the multilayered reactor block of the present invention can be, for example and without limitations, metals, polymers, silicon, ceramic, glass or a combination thereof. Stainless steel, titanium, nickel, aluminum, silicon, glass, and PDMS (Polydimethylsiloxane) can be used for microreactor fabrication. Various types of fabrication techniques well-known in the art, such as, etching, DRIE (deep reactive ion etching), EDM (electro-discharge machining), laser cutting, mechanical micromilling, grinding and the like, can be used depending on the materials used to fashion the plates.

Figure 2:
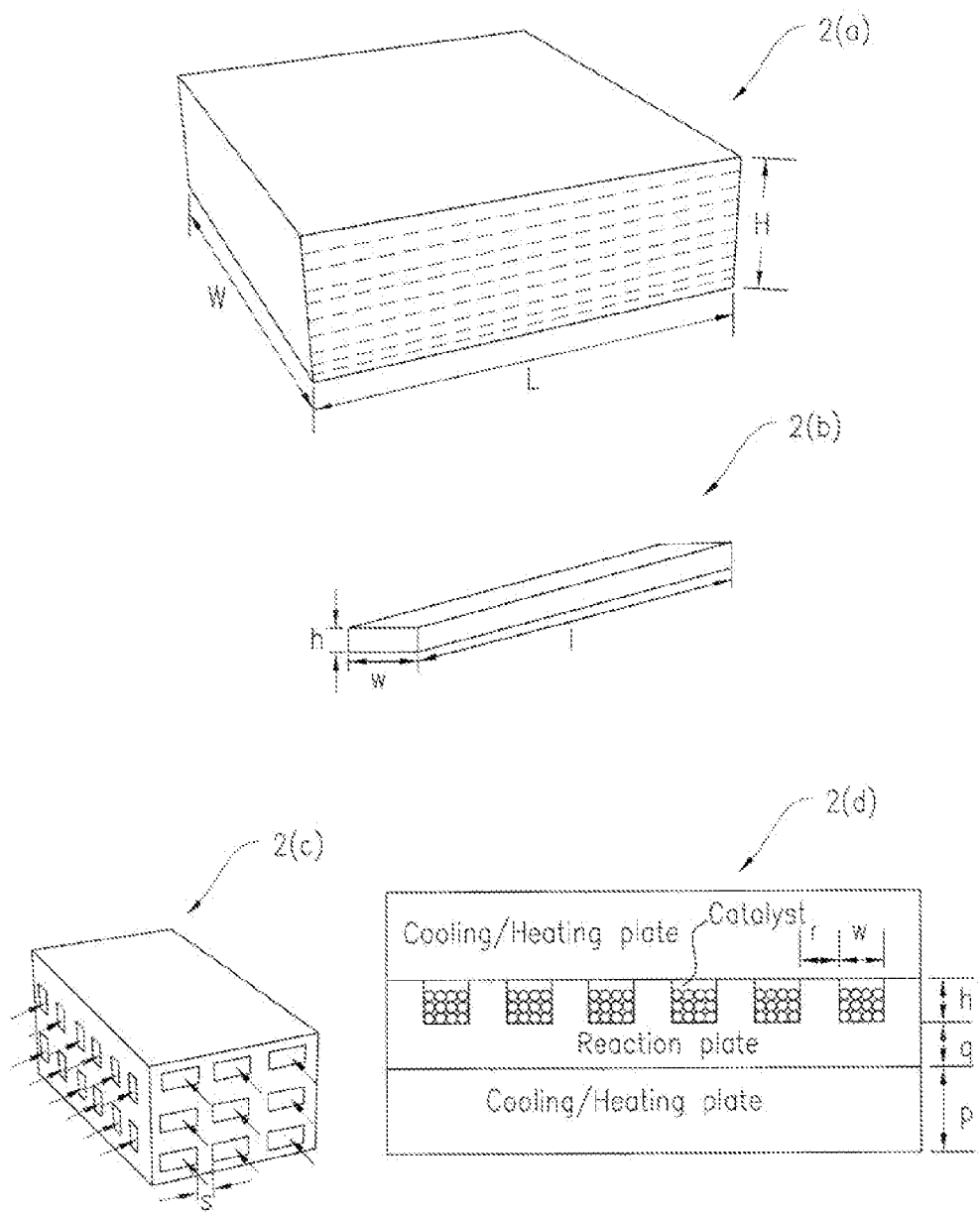
FIG. 2: schematic illustrations of a three-dimensional view of a multilayered reaction block of the present invention (2a), a three-dimensional view of a microchannel of the present invention (2b), a three-dimensional view of a multilayered reaction block of the present invention with flow arrangement (2c), and a cross-sectional view of a multilayered reaction block of the present invention (2d).

In forming the multilayered reactor block of the present invention, the alternating sequence of reactor plates and heat exchanger plates are layered one on top of the other (FIGS. 2: (2a), (2c) and (2d)). Often each reactor plate is layered between two heat exchanger plates (FIGS. 2: (2d)). In some embodiments of the present invention, a reactor plate and a heat exchanger plate are bonded. Various bonding methods can be used, for example and without limitation, anodic bonding, direct bonding and adhesive bonding, depending upon the nature of the materials of the plates to be bonded. In some embodiments, bonding of the plates is by ionic diffusion. In some embodiments, bonding of the plates is by thermal diffusion. A thin bonding layer (i.e., inter-bonding material) will or will not be present between the reactor plate and the heat exchanger plate. In some embodiments, the inter-bonding material is present between plates; in some embodiments, it is absent. Various inter-bonding materials known in the art can be used, for example and without limitation, glass, alloy and quartz. In some embodiments, the reactor plate and heat exchanger plate are bonded with glass, such as lead glass. The bonding material is applied as a uniform layer of a thickness that avoids interference with the dimensions of the microchannels of each plate (i.e., the reaction channels of a reactor plate and the heat exchange channels of a heat exchange plate). In some embodiments, the bonding material layer has a thickness from about 10 microns to about 20 microns (inclusive or exclusive of endpoints). In some embodiments, the bonding material layer has a thickness of about 10 microns, about 11 microns, about 12 microns, about 13 microns, about 14 microns, about 15 microns, about 16 microns, about 17 microns, about 18 microns, about 19 microns, or about 20 microns. In some embodiments, the bonding material layer has a thickness of about 15 microns.

In some embodiments, the length of each distribution channel (which is a microchannel) of a pair of interdigitated distribution channels of the reactor input manifold of the present invention is substantially equal (i.e., of equivalent length). In some embodiments, the total path length for each reaction channel of the present invention and its associated reactor input chamber, associated pair(s) of interdigitated distribution channels of the multilamination chamber, associated reactor output chamber and associated collection channel is substantially equal to one another.

In some embodiments, the plurality of reaction channels of the reaction plates of the present invention are substantially in parallel and the plurality of heat exchange channels of the heat exchanger plates of the present invention are substantially in parallel.

In some embodiments, the heat exchange channels of the heat exchanger plates of the present invention are substantially perpendicular to the reaction channels of the reaction plates of the present invention. In some embodiments, the heat exchanger channels and the reaction channels are in a cross-flow configuration. For example, in some embodiments, the alternating sequence of the plurality of reactor plates and heat exchanger plates is a cross-flow configuration. A cross-flow configuration allows integration of the chemical reaction occurring in the reactor plates and the heat exchange through the heat exchange plates, thus providing effective heat management, i.e., minimal or no formation of "hot spots" or "quench points", which can be severely detrimental to reactor performance, and often characteristic of macroreactors.

In some embodiments, the microchannnels of the scalable microreactor of the present invention have at least one depth or width value that is in submillimeters to millimeters. In some embodiments, at least one depth or width value is in submillimeters. In some embodiments, at least one depth or width value is no greater than about 3 mm; about 1 mm; about 0.5 mm; or about 0.1 mm. The length of the microchannels can be of any dimension. In some embodiments, the length of the microchannels is in the order of inches. In some embodiments, the length of the microchannels is no more than about 6 inches; about 3 inches; about 1 inch or about 0.5 inch.

The micro dimensions and compact design (i.e., reactor block and manifolds as one unit) of the microreactor system of the present invention allows for orders of magnitude enhancement of mass and heat transfer rates while allowing for throughput comparable to that of macroreactors.

In some embodiments, at least one pair of interdigitated distribution channels of the reactor input manifold of the present invention comprises two adjacent interdigitated distribution channels. In some embodiments, each pair of interdigitated distribution channels is positioned so as to feed a multiphase reaction stream into one reaction channel, where the multiphase reaction stream comprises a first feed stream from one distribution channel of each pair of interdigitated distribution channels and a second feed stream from the second distribution channel of each pair of interdigitated distribution channels.

In some embodiments, at least one pair of interdigitated distribution channels of the reactor input manifold of the present invention feeds (i.e., is aligned so as to fluidly connect) into one reaction channel. In some such embodiments, one pair of interdigitated distribution channels feeds into one reaction channel. In some such embodiments, two pairs of interdigitated distribution channels feeds into one reaction channel. In some such embodiments, three pairs of interdigitated distribution channels feed into one reaction channel.

In some embodiments, the wall between each pair of interdigitated distribution channels of the reactor input manifold of the present invention is substantially aligned with the wall between the reaction channels of the reactor plates.

In some embodiments, the plurality of collection channels of the reactor output manifold of the present invention is a substantially equivalent number as that for the plurality of reaction channels of each reactor plate. In some such embodiments, the wall between each collection channel is substantially aligned to the wall between each reaction channel. In some embodiments, the reactor output manifold of the present invention comprises at least two reactor output chambers.

In some embodiments, the reactor input manifold and the reactor output manifold are detachable from the multilayered reactor block. In some embodiments, all four manifolds (reactor input, reactor output, heat exchange input and heat exchange output manifolds) are detachable from the multilayered reactor block.

The cross section of the channels of the reactor and heat exchanger plates of the scalable microreactor of the present invention can be any shape, for example and without limitation, rectangular, square, trapezoidal, triangular, circular, or semi-circular. In some embodiments, the scalable microreactor plates are rectangular. In such an embodiment, the reactor block of the scalable microreactor is rectangular. In some embodiments, the lengthwise dimensions of the cross section of the plates vary. In some embodiments, the lengthwise dimensions of the cross section of the plates are constant.

In some embodiments, the reaction taking place in the scalable microreactor of the present invention requires liquid or solid catalyst. In some such embodiments, the scalable microreactor further comprises a catalyst. Catalysts useful in the microreactor of the present invention will depend on, for example and without limitation, the reaction to be performed in the microreactor. Catalysts useful in the microreactor of the present invention can be liquid or solid. Useful catalysts can include, without limitation, liquid acid and noble metal on solid support. The solid catalyst can be prepared by the method described by Lawal et al. in U.S. patent application Ser. No. 11/406,201 filed Apr. 18, 2006.

In some embodiments, the liquid catalyst can be fed pure or mixed with one of the feed streams. In some embodiments, the solid catalyst of the present invention is in the form of particles or pellets. In some embodiments, the catalyst is placed in the reaction channels of the reaction plates. In some embodiments, the solid catalyst is packed into each reaction channel (and optionally, each heat exchange channel when used for a second reaction). In some embodiments, the solid catalyst is coated on the interior walls of each reaction channel (and optionally, each heat exchange channel when used for a second reaction) as a thin-film. When the microreactor of the present invention is packed with a solid catalyst, the flow distribution amongst the reactor channels as well as the cross-sectional temperature distribution is better than that for the coated-wall case. However, when the channel of the reactor plates of the present invention is coated with a thin film, the pressure drop through each microchannel is negligible compared to the reactor pressure, and much lower than that of a packed bed. When the catalyst is packed into each reaction channel (and optionally, each heat exchange channel when used for a second reaction), the microreactor can be referred to as a packed bed microreactor. The catalyst can be packed into or unpacked from the microreactor by removing one or more manifolds, which are detachable, from the microreactor. When the catalyst is coated onto the interior walls of each reaction channel, e.g., as a thin-film of catalyst, the microreactor can be referred to as a thin-film microreactor or empty bed microreactor. The catalyst can be coated onto the internal walls of the microchannels of the plates of the microreactor by removing one or more manifolds, which are detachable, from the microreactor.

In some embodiments, the scalable microreactor of the present invention further comprises a filter. In some embodiments of the present invention, the filter is positioned between a face of the reactor block and a manifold. In some such embodiments, the filter is positioned between the reactor input manifold and the first face of the multilayered reactor block, the reactor output manifold and the second face of the reactor block, the heat exchange input manifold and the third face of the reactor block, the heat exchange output manifold and the fourth face of the reactor block, or a combination thereof. Filters useful with the microreactor of the present invention should be of microscale dimensions (e.g., submillimeter) and appropriate for the reaction for which the microreactor is to be used, such as glass beads, metal gauze, plastic and nylon membranes or any others well-known in the art.

In some embodiments, the scalable microreactor of the present invention further comprises at least one flame arrester when a stream is flammable. In some such embodiments, at least one flame arrester is positioned in one reactant input chamber, the reactor output chamber, the heat exchange input chamber, the heat exchange output chamber or a combination thereof. The flame arrester can prevent downstream flame propagation efficiently. Flame arresters useful with microreactors of the present invention are well-known to those skilled in the art, and include metal grids, metal foam, and porous fiber.

In some embodiments, each reactor plate of the multilayered reaction block of the present invention has a thickness from about 0.05 mm to about 10 mm (inclusive or exclusive of endpoints) and a wall thickness between each reaction channel of about 0.02 mm to about 10 mm (inclusive or exclusive of endpoints). See e.g., h+q (reactor plate thickness) and r (reaction channel wall thickness) of FIG. (2$d$).

In some embodiments, each heat exchanger plate of the multilayered reactor block of the present invention has a thickness from about 0.05 mm to about 10 mm (inclusive or exclusive of endpoints) and a wall thickness between each heat exchange channel of about 0.02 mm to about 10 mm (inclusive or exclusive of endpoints). See e.g., p (heat exchanger plate thickness) of FIG. (2d) and s (heat exchange channel wall thickness) of FIG. (2c).

In some embodiments, the microchannels of each plate of multilayered reactor block of the present invention have the same dimensions. In some embodiments, the microchannels of the reactor plates have different dimensions from the microchannels of the heat exchanger plates. In some embodiments, each reaction channel has a width from about 0.02 mm to about 10 mm and a length from about 1 mm to about 250 mm. In some embodiments, each heat exchange channel has a width from about 0.02 mm to about 10 mm and a length from about 1 mm to about 250 mm. See e.g., w of FIG. (2b). In some embodiments, each interdigitated distribution channel of the reactor input manifold has a width from about 0.01 mm to about 1 mm, and a wall thickness between each interdigitated distribution channel of about 0.01 mm to about 1 mm (inclusive or exclusive of endpoints). See e, f and g of FIG. (6a).

The multilayered reactor block of the scalable microreactor of the present invention comprises a number of plates. The total number of plates can vary because of, e.g., amount of product required, amount of available reactants, and space issues such as availability, size, and location of the space for the microreactor. In some embodiments, the total number of plates of the multilayered reaction block comprises X reactor plates and X+1 heat exchanger plates, where X is a positive integer. In some embodiments, the multilayered block comprises 3 plates, 1 reactor plate and 2 heat exchange plates.

Each plate of the multilayered reactor block of the present invention comprises a number of microchannels. The total number of microchannels per plate can vary because of, e.g., compactness of the microreactor, amount of product required, phase of reactants, reaction medium and/or heat exchange medium, and material comprising the reactor and or heat exchange plates. In some embodiments, each reactor plate of the multilayered reactor block comprises about 20 to about 300 reaction channels. In some embodiments, each heat exchange plate of the multilayered reactor block comprises about 20 to about 300 heat exchange channels.

In some embodiments, the reactor of the multilayered reactor block comprises at least 5 reactor plates, each reactor plate having about 20 to about 300 reaction channels. In some embodiments, the heat exchanger of the multilayered reactor block comprises at least 6 heat exchanger plates, each heat exchanger plate having about 20 to about 300 heat exchange channels.

In some embodiments, the scalable microreactor of the present invention further comprises a housing that contains the multilayered reactor block, reactor input manifold, reactor output manifold, heat exchange input manifold and heat exchange output manifold. Useful materials for fashioning the housing are well known to those skilled in the art and can include, for example and without limitation metals, plastics such as thermoresistant plastics, and inorganic non-metallic substances such as ceramics.

In some embodiments of the scalable microreactor of the present invention, (1) the heat exchange input manifold comprises at least two heat exchange input chambers that are positioned to receive independently a first heat exchange feed stream and a second heat exchange feed stream, and further comprises a multilamination chamber fluidly coupled to the at least two heat exchange input chambers, the multilamination chamber comprising a plurality of interdigitated distribution channels for feeding independently the first and the second heat exchange feed streams received from the heat exchange input chambers into the microchannels of the heat exchange plates, where the heat exchange input manifold is configured so that each heat exchange channel inlet of the multilayered reaction block is aligned and in fluid communication with at least one pair of interdigitated distribution channels, and (2) the heat exchange output manifold further comprises a collection chamber fluidly coupled to at least two heat exchange output chambers, the collection chamber comprising a plurality of collection channels for directing heat exchange output stream from the plurality of heat exchange channel outlets to at least two heat exchange output chambers, where the heat exchange output manifold is configured so that each heat exchange channel outlet of the multilayered reaction block is aligned and in fluid communication with a collection channel. Thus, a second multiphase reaction can be performed via the heat exchange input manifold, heat exchanger plates and heat exchange output manifold that thermally regulates a first reaction performed via the reactor input manifold, reactor plates and reactor output manifold. In some such embodiments, the heat exchanger plates of the multilayered reactor block function as a reactor for another reaction thereby producing a second product. For example, an exothermic chemical reaction can be performed in the reactor plates and an endothermic reaction can be performed in the heat exchanger plates, and vice versa.

Another aspect of the present invention is a method of performing a reaction where the reaction occurs in a scalable microreactor of the present invention. Thus, a reaction can be carried out by use of a microreactor system where the reaction itself actually occurs in the microreactor unit of the system and the microreactor unit is a scalable microreactor of the present invention, and more specifically, the reaction actually occurs in the microchannels of the plates of the multilayered reactor block of the scalable microreactor.

The scalable microreactor of the present invention can be used for multiphase chemical reactions, such as, direct synthesis of hydrogen peroxide as described by Lawal et al. in U.S. patent application Ser. No. 11/406,201 filed Apr. 18, 2006, gas-liquid hydrogenation, catalytic hydrogenation and nitration. The scalable microreactor of the present invention could be useful, for example and without limitation, with different chemical reactions such as gas-liquid, gas-gas, liquid-liquid (e.g., miscible and immiscible liquid-liquid reactions), with or without solid catalyst, and which can benefit from microreactor technology. When a solid catalyst is also used, the chemical reaction can be referred to, e.g., as a gas-liquid-solid reaction, gas-gas-solid reaction or liquid-liquid-solid reaction. Both heterogeneous and homogeneous reactions can be performed with a microreactor of the present invention. The reaction can be exothermic or endothermic.

In some embodiments, the method of the present invention comprises the steps of:
a) providing a scalable microreactor of the present invention;
b) feeding a first feed stream and a second feed stream through the reactor input manifold to form a plurality of multiphase reaction streams;
c) feeding the plurality of multiphase reaction streams through the inlets of the plurality of reaction channels and into the reaction channels;
d) reacting the plurality of multiphase reaction streams to create a plurality of product streams;
e) feeding a heat exchange feed stream through the heat exchange input manifold to form a plurality of heat exchange streams, which are then fed through the inlets of the plurality of heat exchange channels and into the heat exchange channels;

f) collecting in the reactor output manifold the plurality of product streams from the outlets of the plurality of reaction channels; and g) collecting in the heat exchange output manifold the plurality of heat exchange streams from the outlets of the plurality of heat exchange channels.

In some embodiments, the method of the present invention further comprises processing the plurality of product streams collected, e.g., to obtain a more purified product.

In some embodiments, the first feed stream of the method of the present invention comprises a first reactant and the second feed stream of the present invention comprises a second reactant.

In some embodiments, the first feed stream of the method of the present invention comprises at least two reactants that are fed as a mixture and the second feed stream of the present invention comprises a reaction medium.

In some embodiments, the first feed stream of the method of the present invention comprises a gas and the second feed stream of the present invention comprises a liquid. In some embodiments, the first feed stream of the method of the present invention comprises a first liquid and the second feed stream comprises a second liquid that is immiscible with the first liquid.

In some embodiments, at least two reactants of the present invention are hydrogen and oxygen and the reaction medium is water. In some embodiments, the scalable microreactor of the method of the present invention further comprises a catalyst. In some embodiments, the product of the method of the present reaction is hydrogen peroxide. In some embodiments, the plurality of multiphase reaction streams is reacted at a temperature between about 0° C. and about 100° C. In some embodiments, the plurality of multiphase reaction streams is reacted at a reaction pressure between about 1 atmosphere and about 30 atmospheres. In some embodiments, the plurality of heat exchange feed streams of the method of the present invention comprises water or air.

In some embodiments, the method of present invention comprises the steps of:

a) providing a scalable microreactor of the present invention;

b) feeding a first feed stream and a second feed stream through the reactor input manifold to form a first plurality of multiphase reaction streams;

c) feeding a third feed stream and a fourth feed stream through the heat exchange input manifold to form a second plurality of multiphase reaction streams;

d) feeding the first plurality of multiphase reaction streams of step b) through the inlets of the plurality of reaction channels and into the reaction channels;

e) feeding the second plurality of multiphase reaction streams of step c) through the inlets of the plurality of heat exchange channels and into the heat exchange channels;

f) reacting the first plurality of multiphase reaction streams to create a first plurality of product streams;

g) reacting the second plurality of multiphase reaction streams to create a second plurality of product streams;

h) collecting in the reactor output manifold the first plurality of product streams from the outlets of the plurality of reaction channels; and i) collecting in the heat exchange output manifold the second plurality of product streams from the outlets of the plurality of heat exchange channels.

In some embodiments of the method of the present invention, the second plurality of multiphase reaction streams thermally regulates the first plurality of multiphase reaction streams.

In some embodiments, the method of the present invention further comprises processing the first product stream collected at step h), the second product stream collected at step i) or a combination thereof. Such processing can be, for example and without limitation, any of the various finishing steps well known in the chemical processing art, such as removing residual reactants and by-products (i.e., purifying the product), concentrating the product, diluting the product, or a combination thereof.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. All the examples disclosed herein show the theoretical results based on theoretical analysis and computational fluid dynamic (CFD) simulations.

In all the examples, the manifold configuration is varied, as well as the reactor length. The notation of the symbols in the following text is depicted in FIGS. 2 and 6 and represents the dimensions of the scalable microreactor of the present invention used in the following Examples. The typical values of the dimensions are listed here, unless stated specifically in the Examples: (1) length of reactor block, L=about 152.4 mm, (2) width of reactor block, W=about 76.2 mm, (3) height of reactor block, H=about 19.29 mm, (4) length of each microchannel, I=about 152.4 mm, (5) width of each microchannel, w=about 0.5 mm, (6) depth of each microchannel, h=about 0.5 mm, (7) width of an inlet to a reactor input chamber of the reactor input manifold, a=about 10 mm, (8) height of the reactor input chamber of the reactor input manifold, b=about 49 mm, (9) length of the multilamination chamber of the reactor input manifold, c=about 22 mm, (10) thickness of the reactor input manifold, d=about 0.5 mm, (11) width of a distribution channel of the multilamination chamber, e=about 0.15 mm, (12) width of a distribution channel interdigitated to distribution channel f=about 0.15 mm, (13) wall thickness of interdigitated distribution channels, g=about 0.2 mm, (14) height of the heat exchange input chamber of the heat exchange input manifold, m=about 71 mm, (15) inlet to heat exchange input chamber of the heat exchange input manifold, n=about 20 mm, (16) thickness of the heat exchange input manifold, o=about 0.5 mm, (17) thickness of each heat exchanger plate, p=about 1.015 mm, (18) thickness of each reaction plate minus depth of a reaction microchannel, q=about 0.5 mm, (19) wall thickness of each reaction channel of a reaction plate, r=about 0.2 mm, (20) angle of the junction between b and d, $\theta$=about 120°, and (21) angle of the junction between m and o, $\phi$=about 120°.

The reaction channels have solid catalyst deposited as a thin film on their interior walls (for wall surface reaction) and the heat exchange channels are empty. The reactor output chamber of the reactor output manifold for the reactor block have the same dimensions as that of the reactor input manifold, and the two chambers on the reactor input manifold and on the reactor output manifold are symmetric with respect to the central line of their respective manifold. The collection chamber of the reactor output manifold is in alignment with the reaction channels, and the reactor output manifold has the same length as the reactor input manifold. The heat exchange output manifold has a similar configuration to that of the heat exchange input manifold, but in the opposite direction. That is to say, the geometry of the heat exchange input manifold and the geometry of the output manifold are configured the same but orientated in opposite directions.

The multilayered reactor block has nine (9) reactor plates with each reactor plate having 87 microchannels for a total of 783 microchannels. The length of each reaction channel is about 152.4 mm (about 6"). The multilayered reactor has nine (9) heat exchange plates, each heat exchange plate having 175 microchannels for a total of 1575 microchannels. The length of each heat exchange channel is about 76.2 mm (about 3"). The reactor and heat exchange plates are alternated and in cross-flow configuration to form a multilayered reactor block of 18 layers (plates). Thus, there are 9 plates of each type (i.e., reactor and heat exchanger) and hence, every reactor plate is not sandwiched between two heat exchanger plates.

The data plotted in FIGS. 7-15 represent the velocity inside the microchannels. FIGS. 7-15(*a*) show the velocity distribution among the microchannels on the same plate (plate 1, 3, 5, 7 and 9, counting from the top of the reactor block) and FIGS. 7-15(*b*) show the velocity distribution between different layers (at the location that equated to about the middle of the channel's length). The sample fluid is air with a flow rate of about 0.50 liters per minute (l/min.) at about 25° C. and about 300 psi for the reactor plates while for the heat exchanger plates, the sample fluid is water with a flow rate of about 1.00 l/min at ambient temperature and atmospheric pressure.

The variation described below is defined as the difference between the maximum and minimum values divided by the average value in percentage.

Example 1

Figure 7:
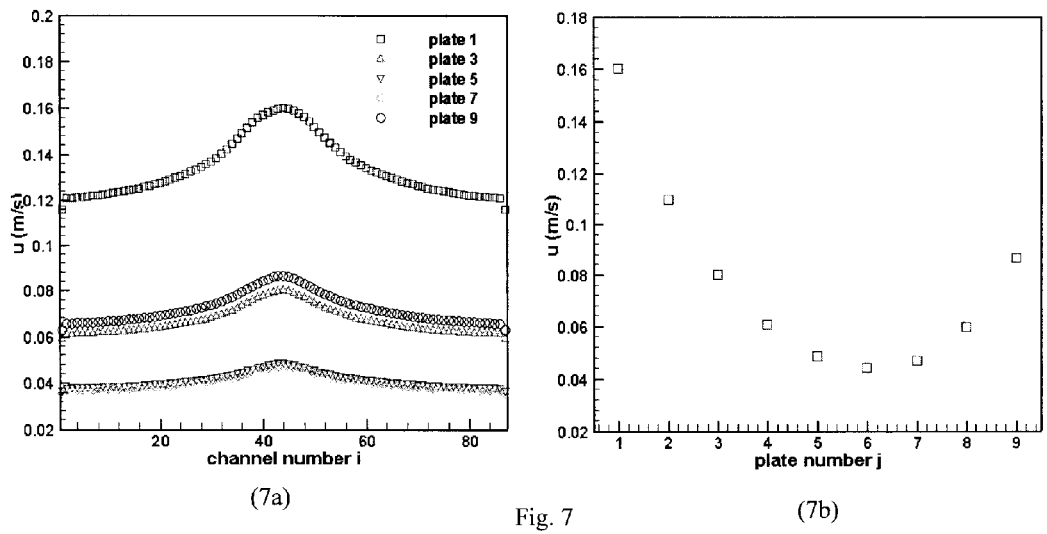

Flow Distribution Among Reaction Channels and Between Different Plates for One Configuration of the Reactor Stack In this Example, the length l of the reaction channel is about 25.4 mm and the height of reactor input chamber b is about 30 mm. As shown in FIG. 7, the variation of the flow among the microchannels on the same plate was about +14.2% (plate 5), and the variation of the flow among different plates is about ±56.9%. The total variation of the flow among all the microchannels is about ±65.6%. The maximum flow rate is at the center of the top plate, and the minimum flow rate is at the corner of the middle plate.

Example 2

Figure 8:
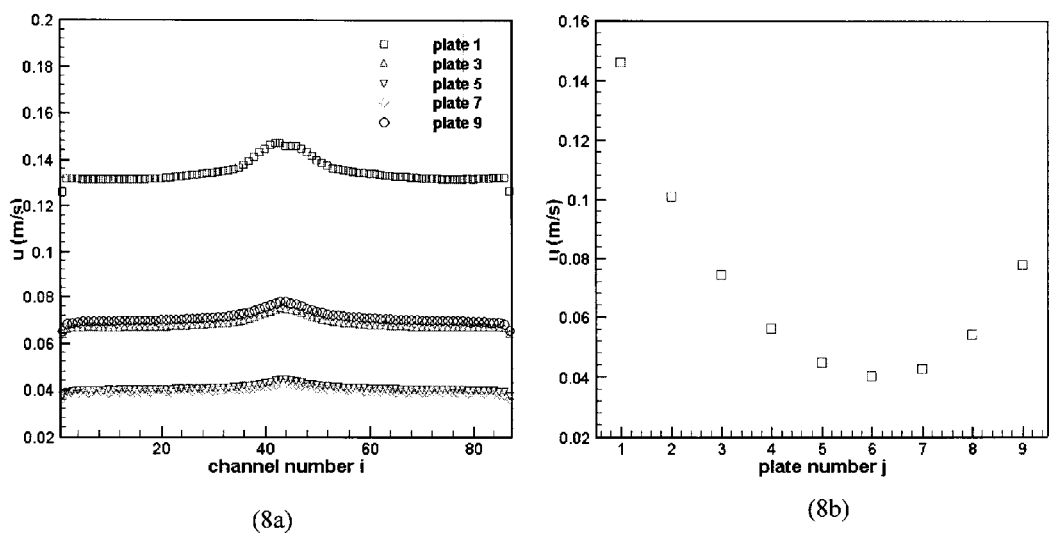

Flow Distribution Among Reaction Channels and Between Different Plates for Another Configuration of the Reactor Stack In this Example, the length l of the reaction channel is about 25.4 mm, the height of the reactor input chamber b is about 20 mm, and the angle θ is about 150°. As shown in FIG. 8, the variation of the flow among the microchannels on the same plate is about ±8.5% (plate 5) and the variation of the flow among different plates is about ±56.8%. The total variation of the flow among all the microchannels is about ±62.3%. Compared to Example 1, the change in the geometrical configurations of the input and output chambers results in some improvement of the flow distribution amongst the reaction channels on the plate, but no significant improvement in the distribution between the plates.

Example 3

Flow Distribution Among Reaction Channels and Between Different Plates for Another Configuration of the Reactor Stack In this Example, the length of the reaction channel is about 25.4 mm, the height of the reactor input chamber b is about 30 mm and the height of the multilamination chamber c is about 30 mm. As shown in FIG. 9, the variation of the flow among the microchannels on the same plate is about ±3.8% (plate 5) and the variation of the flow among different plates is about ±55.9%. The total variation of the flow among all the microchannels is about ±58.5%. Compared to Example 1, the change in the geometrical configurations of the multilamination and collection chambers enables significant improvement of the flow distribution amongst the reaction channels on the plate, but no appreciable improvement in the distribution between the plates.

Example 4

Figure 10:
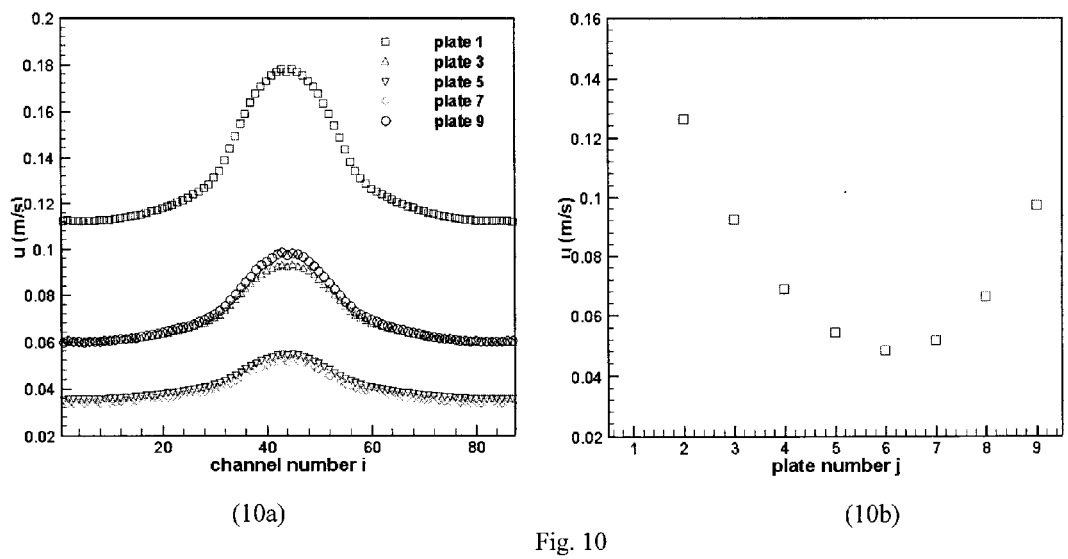

Flow Distribution Among Reaction Channels and Between Different Plates for Another Configuration of the Reactor Stack In this Example, the length of the reaction channel is about 25.4 mm, the height of the reactor input chamber b is about 5 mm, and the height of the multilamination chamber c is about 30 mm. As shown in FIG. 10, the variation of the flow among the microchannels on the same plate is about ±20.8% (plate 5) and the variation of the flow among different plates is about ±57.1%. The total variation of the flow among all the microchannels is about ±69.5%. Compared to Example 1, the change of the geometrical configurations of the input and output chambers and the multilamination and collection chambers makes the flow distribution worse amongst the plate reaction channels and between plates.

Example 5

Figure 11:
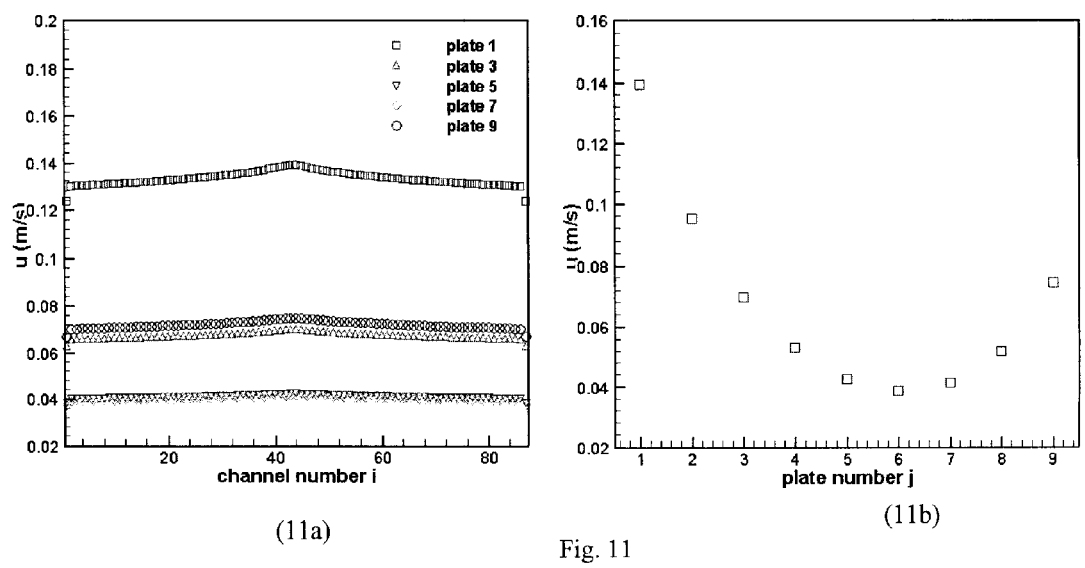

Flow Distribution Among Reaction Channels and Between Different Plates for Another Configuration of the Reactor Stack In this Example, the length of the reaction channel is about 25.4 mm. As shown in FIG. 11, the variation of the flow among the microchannels on the same plate is about ±9.9% (plate 5) and the variation of the flow among different plates is about ±56.5%. The total variation of the flow among all the microchannels is about ±59.8%. Compared to Example 1, this configuration of the input and output chambers achieves a small improvement in the flow distribution amongst the reaction channels on the plate, but no appreciable improvement in the distribution between the plates.

Example 6

Figure 12:
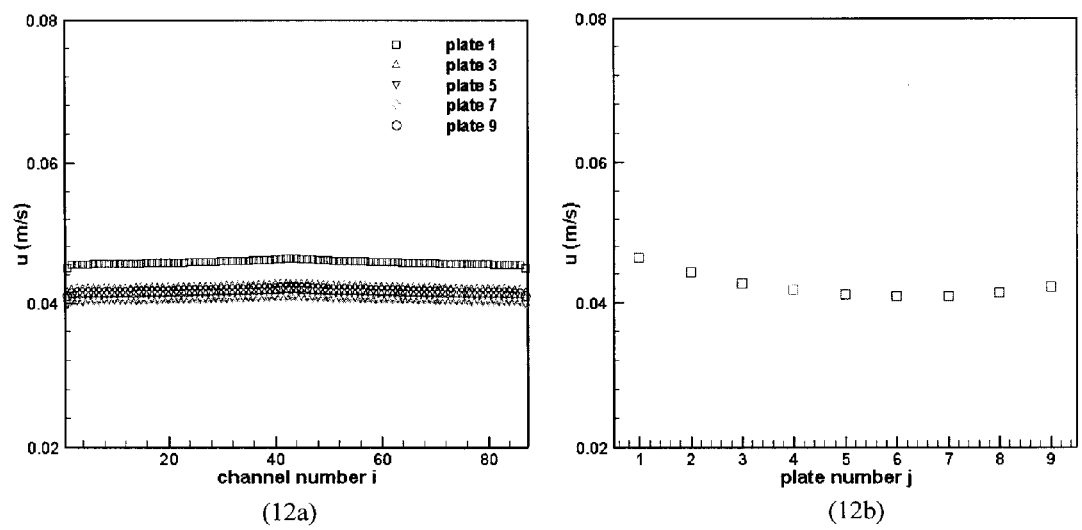

Flow Distribution Among Reaction Channels and Between Different Plates for Another Configuration of the Reactor Stack In this Example, the length of the reaction channel is about 152.4 mm with a filter positioned between the reactor input manifold and the multilayered reactor block. As shown in FIG. 12, the variation of the flow among the microchannels on the same plate is about ±1.4% (plate 5) and the variation of the flow among different plates is about ±6.2%. The total variation of the flow among all the microchannels is about ±7.5%. Compared to Example 5, the change of the reactor length and the incorporation of a filter achieve an improvement in the flow distribution amongst the reaction channels on the plate, and a significant improvement in the flow distribution between the plates.

Example 7

Flow Distribution Among Reaction Channels and Between Different Plates for Another Configuration of the Reactor Stack In this Example, the length of the reaction channel is about 25.4 mm and the thickness of the reactor input manifold d is about 0.8 mm. As shown in FIG. 13, the variation of the flow among the microchannels on the same plate is about ±9.1% (plate 5), and the variation of the flow among different plates is about ±37.3%. The total variation of the flow among all the microchannels is about ±45.0%. Compared to Example 5, the change of the manifold thickness achieves a very slight improvement in the flow distribution amongst the reaction channels on the plate with a variation of ±9.1% in this example compared to ±9.9% for example 5, but some improvement in the flow distribution between the plates with a variation of ±37.3% compared to ±56.5% before.

Example 8

Figure 14:
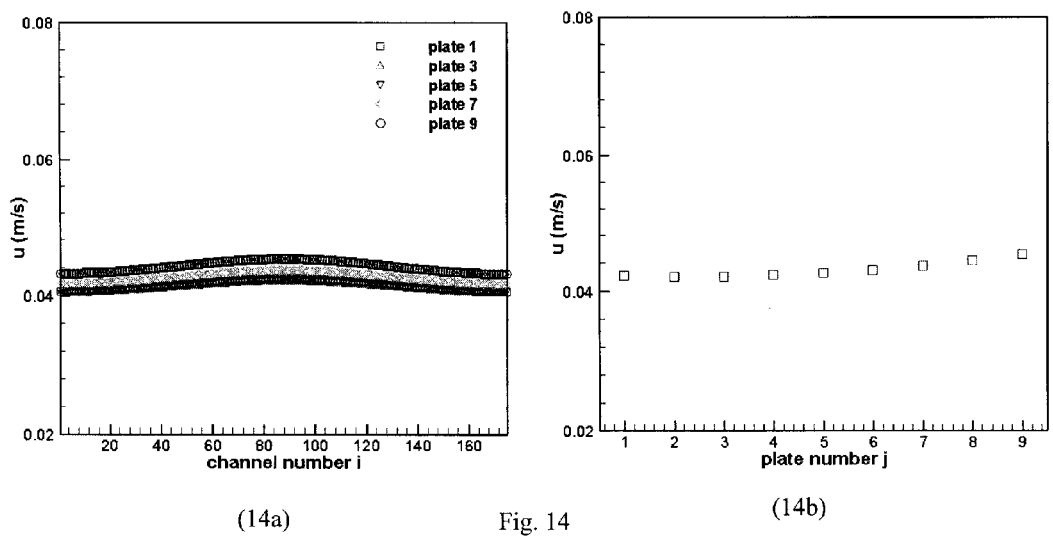
FIG. 14: graphical representations of flow distribution among heat exchange channels (14a) and between different plates (14b) for Example 8 of the present invention.

Flow Distribution Among Heat Exchange Channels and Between Different Plates for One Configuration of the Reactor Stack This Example shows the flow distribution in the microchannels of the heat exchange plates of the multilayered reactor block. The length of the microchannels is about 76.2 mm, with a filter positioned between the input manifold and the multilayered reactor block, and another filter positioned between the output manifold and the multilayered reactor block. As shown in FIG. 14, the variation of the flow among the microchannels on the same plate is about ±2.3% (plate 5) and the variation of the flow among different plates is about ±3.5%. The total variation of the flow among all the microchannels is about ±5.5%. The flow distribution in this example is good, because the variation of the flow amongst the channels as well as the different plates is under 10%. Besides the requirement of uniform flow distribution in the heat exchange channels is not as necessary as that in the reaction channels.

Example 9

Figure 15:
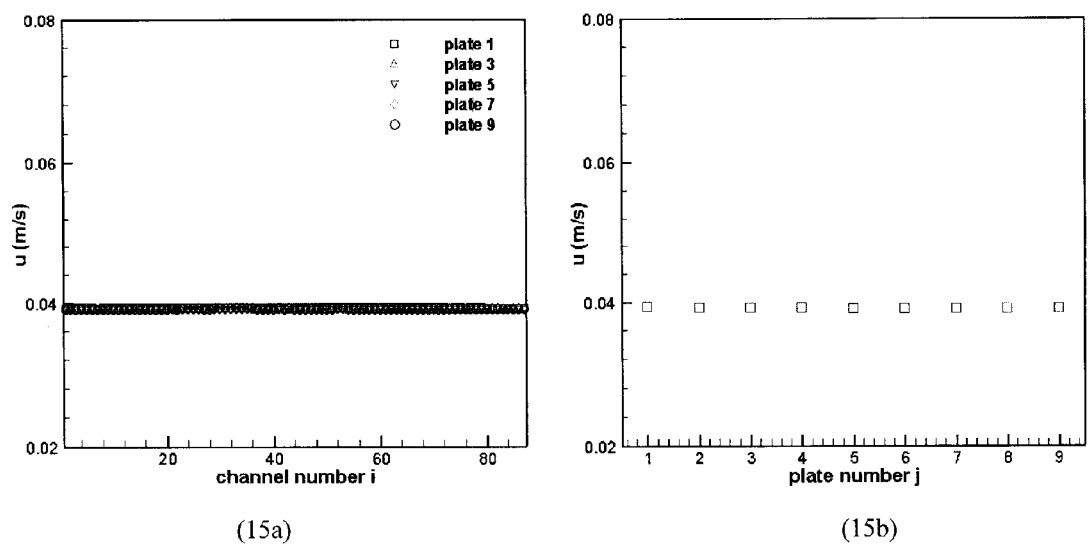
FIG. 15: graphical representations of flow distribution among reaction channels (15a) and between different plates (15b) for Example 9 of the present invention.

Flow Distribution Among Reaction Channels and Between Different Plates for an About 1 kg/hr. Hydrogen Peroxide Reactor Block This example is for an about 1 kg/hr. hydrogen peroxide production. The gas stream is a mixture of hydrogen and air with a flow rate of about 0.46 l/min at about 25° C. and about 300 psi. The liquid stream is water with flow rate of about 0.0164 l/min at about 25° C. and about 300 psi. The length of the channel is about 152.4 mm. The reactor channels are packed with about 75 micron pellet catalyst. As shown in FIG. 15, the variation of the flow among the channels on the same plate is about ±0.05% (plate 5), and the variation of the flow among different plates is about ±0.23%. The total variation of the flow among all the channels is about ±0.27%. Compared to Example 5, the packing of the reactor channels with particulate catalyst achieves dramatic improvement in the flow distribution amongst the reactor channels, as well as between the plates.

While the present invention has been described with respect to what are some embodiments of the invention, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A scalable microreactor comprising:
a) a multilayered reaction block comprising:
(i) a plurality of reactor plates, each reactor plate having a plurality of reaction channels with each reaction channel having an inlet and an outlet;
(ii) a plurality of heat exchanger plates, each heat exchanger plate having a plurality of heat exchange channels with each heat exchange channel having an inlet and an outlet; and
(iii) four faces,
wherein:
(A) the plurality of reactor plates and heat exchanger plates are arranged in an alternating sequence to form the multilayered reaction block;
(B) the plurality of reaction channel inlets are aligned on a first face of the multilayered reaction block;
(C) the plurality of reaction channel outlets are aligned on a second face of the multilayered reaction block;
(D) the plurality of heat exchange channel inlets are aligned on a third face of the multilayered reaction block; and
(E) the plurality of heat exchange channel outlets are aligned on a fourth face of the multilayered reaction block;
b) a reactor input manifold coupled to the first face of the multilayered reaction block, the reactor input manifold comprising:
(i) at least two reactor input chambers; and
(ii) a multilamination chamber fluidly coupled to the at least two reactor input chambers, the multilamination chamber comprising a plurality of interdigitated distribution channels for feeding independently at least a first feed stream and a second feed stream from the at least two reactor input chambers,
wherein the reactor input manifold is configured so that each reaction channel inlet of the multilayered reaction block is aligned and in fluid communication with at least one pair of interdigitated distribution channels;
c) a reactor output manifold coupled to the second block face, the reactor output manifold comprising:
(i) at least one reactor output chamber; and
(ii) a collection chamber fluidly coupled to the at least one reactor output chamber, the collection chamber comprising a plurality of collection channels for directing a reaction output stream from the plurality of reaction channel outlets to the at least one reactor output chamber,
wherein the reactor output manifold is configured so that each reaction channel outlet of the multilayered reaction block is aligned and in fluid communication with a collection channel;

d) a heat exchange input manifold coupled to the third face of the multilayered reaction block, the heat exchange input manifold comprising at least one heat exchange input chamber that is positioned to receive a heat exchange feed stream and is in fluid communication with the plurality of heat exchange channel inlets of the multilayered reaction block; and e) a heat exchange output manifold coupled to the fourth face of the multilayered reaction block, the heat exchange output manifold comprising at least one heat exchange output chamber that is positioned to receive a heat exchange output stream and is in fluid communication with the plurality of heat exchange channel outlets of the multilayered reaction block.

2. The scalable microreactor of claim 1, wherein each distribution channel of a pair of interdigitated distribution channels is of substantially equal length.

3. The scalable microreactor of claim 1, wherein total path length for each reaction channel and its associated at least one pair of interdigitated distribution channels, distribution chamber, collection channel, and collection chamber is substantially equal.

4. The scalable microreactor of claim 1, wherein the plurality of reaction channels are substantially in parallel and the plurality of heat exchange channels are substantially in parallel.

5. The scalable microreactor of claim 1, wherein the heat exchange channels are substantially perpendicular to the reaction channels.

6. The scalable microreactor of claim 1, wherein the alternating sequence arrangement of the reactor plates and heat exchanger plates form a cross-flow configuration.

7. The scalable microreactor of claim 1, wherein the at least one pair of interdigitated distribution channels comprises two adjacent interdigitated distribution channels.

8. The scalable microreactor of claim 1, wherein at least one pair of interdigitated distribution channels is in fluid communication with one reaction channel.

9. The scalable microreactor of claim 1, wherein one pair of interdigitated distribution channels is in fluid communication with one reaction channel.

10. The scalable microreactor of claim 1, wherein two pairs of interdigitated distribution channels is in fluid communication with one reaction channel.

11. The scalable microreactor of claim 1, wherein three pairs of interdigitated distribution channels is in fluid communication with one reaction channel.

12. The scalable microreactor of claim 1, wherein between each pair of interdigitated distribution channels is a wall that is substantially aligned to the wall between each reaction channel.

13. The scalable microreactor of claim 1, wherein between each collection channel is a wall that is substantially aligned to the wall between each reaction channel.

14. The scalable microreactor of claim 1, further comprising a catalyst located in the plurality of reaction channels.

15. The scalable microreactor of claim 14, wherein the catalyst comprises particles, pellets or a coating on the channel wall.

16. The scalable microreactor of claim 1, further comprising at least one filter disposed between at least one face of the multilayered reaction block and an input or output manifold.

17. The scalable microreactor of claim 1, further comprising at least one flame arrester located in at least one input chamber, at least one output chamber, or a combination thereof.

18. The scalable microreactor of claim 1, wherein each reactor plate has a thickness from about 0.05 mm to about 10 mm and a wall thickness between each reaction channel of about 0.02 mm to about 10 mm.

19. The scalable microreactor of claim 1, wherein each heat exchanger plate has a thickness from about 0.05 mm to about 10 mm and a wall thickness between each heat exchange channel of about 0.02 mm to about 10 mm.

20. The scalable microreactor of claim 1, wherein each reaction channel has a width from about 0.05 mm to about 10 mm and a length from about 1 mm to about 250 mm.

21. The scalable microreactor of claim 1, wherein each heat exchange channel has a width from about 0.05 mm to about 10 mm and a length from about 1 mm to about 250 mm.

22. The scalable microreactor of claim 1, wherein the multilayered reactor block comprises at least 5 reactor plates, each reactor plate having from about 20 to about 300 reaction channels.

23. The scalable microreactor of claim 1, further comprising a housing in which the multilayered reactor block, reactor input manifold, reactor output manifold, heat exchange input manifold and heat exchange output manifold are disposed.

24. The scalable microreactor of claim 1, wherein the reactor output manifold comprises at least two reactor output chambers.

25. The scalable microreactor of claim 1, wherein:

a) the heat exchange input manifold of d) comprises:
(i) at least two heat exchange input chambers that are positioned to receive independently a first and second heat exchange feed streams; and further comprises:
(a) a multilamination chamber fluidly coupled to the at least two heat exchange input chambers, the multilamination chamber comprising a plurality of interdigitated distribution channels for feeding independently the first and the heat exchange feed streams from the heat exchange input chambers,
wherein the heat exchange input manifold is configured so that each heat exchange channel inlet of the multilayered reaction block is aligned and in fluid communication with at least one pair of interdigitated distribution channels; and b) the heat exchange output manifold of e) further comprises a collection chamber fluidly coupled to the at least one heat exchange output chamber, the collection chamber comprising a plurality of collection channels for directing a heat exchange output stream from the plurality of heat exchange channel outlets to the at least one heat exchange output chamber, wherein the heat exchange output manifold is configured so that each heat exchange channel outlet of the multilayered reaction block is aligned and in fluid communication with a collection channel.

26. A method of performing a reaction, the method comprising:

a) providing a scalable microreactor of claim 1;

b) feeding a first feed stream and a second feed stream through the reactor input manifold to form a plurality of multiphase reaction streams;

c) feeding the plurality of multiphase reaction streams through the inlets of the plurality of reaction channels and into the reaction channels;

d) reacting the plurality of multiphase reaction streams to create a plurality of product streams;

e) feeding a heat exchange feed stream through the heat exchange input manifold to form a plurality of heat exchange streams, which are then fed through the inlets of the plurality of heat exchange channels and into the heat exchange channels;

f) collecting in the reactor output manifold the plurality of product streams from the outlets of the plurality of reaction channels; and g) collecting in the heat exchange output manifold the plurality of heat exchange streams from the outlets of the plurality of heat exchange channels.

27. The method of claim 26, further comprising processing the plurality of product streams collected at step f).

28. The method of claim 26, wherein the first feed stream comprises a first reactant and the second feed stream comprises a second reactant.

29. The method of claim 26, wherein the first feed stream comprises at least two reactants that are fed as a mixture and the second feed stream comprises a reaction medium.

30. The method of claim 28 or claim 29, wherein the first feed stream is a gas and the second feed stream is a liquid.

31. The method of claim 28 or claim 29, wherein the first feed stream is a first liquid and the second feed stream is a second liquid that is immiscible with the first liquid.

32. The method of claim 29, wherein the at least two reactants are hydrogen and oxygen and the reaction medium is water.

33. The method of claim 26, wherein the plurality of multiphase reaction streams is reacted at a temperature between about 0° C. and about 100° C.

34. The method of claim 26, wherein the plurality of multiphase reaction streams is reacted at a pressure between about 1 atmosphere and about 30 atmospheres.

35. The method of claim 26, wherein the plurality of heat exchange feed streams comprises water or air.

36. A method of performing a reaction, the method comprising:

a) providing a scalable microreactor of claim 25;

b) feeding a first feed stream and a second feed stream through the reactor input manifold to form a first plurality of multiphase reaction streams;

c) feeding a third feed stream and a fourth feed stream through the heat exchange input manifold to form a second plurality of multiphase reaction streams;

d) feeding the first plurality of multiphase reaction streams of step b) through the inlets of the plurality of reaction channels and into the reaction channels;

e) feeding the second plurality of multiphase reaction streams of step c) through the inlets of the plurality of heat exchange channels and into the heat exchange channels;

f) reacting the first plurality of multiphase reaction streams to create a first plurality of product streams;

g) reacting the second plurality of multiphase reaction streams to create a second plurality of product streams;

h) collecting in the reactor output manifold the first plurality of product streams from the outlets of the plurality of reaction channels; and i) collecting in the heat exchange output manifold the second plurality of product streams from the outlets of the plurality of heat exchange channels.

37. The method of claim 36, wherein the second plurality of multiphase reaction streams thermally regulates the first plurality of multiphase reaction streams.

38. The method of claim 36, further comprising processing the first product stream collected at step h), the second product stream collected at step i) or a combination thereof.

* * * * *